(12) United States Patent
Nomura et al.

(10) Patent No.: US 11,703,603 B2
(45) Date of Patent: Jul. 18, 2023

(54) RADIOGRAPHY APPARATUS

(71) Applicant: FUJIFILM CORPORATION, Tokyo (JP)

(72) Inventors: Kengo Nomura, Tokyo (JP); Yasunori Narukawa, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 48 days.

(21) Appl. No.: 17/505,646

(22) Filed: Oct. 20, 2021

(65) Prior Publication Data

US 2022/0043169 A1 Feb. 10, 2022

Related U.S. Application Data

(63) Continuation of application No. PCT/JP2020/016154, filed on Apr. 10, 2020.

(30) Foreign Application Priority Data

Apr. 24, 2019 (JP) ................................. 2019-083257

(51) Int. Cl.
*G01T 1/20* (2006.01)
(52) U.S. Cl.
CPC ...................... *G01T 1/20* (2013.01)
(58) Field of Classification Search
CPC ....................................................... G01T 1/20
See application file for complete search history.

(56) References Cited

U.S. PATENT DOCUMENTS

| 5,587,591 | A | 12/1996 | Kingsley et al. |
| 6,455,857 | B1 | 9/2002 | Iwabuchi |
| 9,110,175 | B2 | 8/2015 | Henry et al. |
| 2004/0016886 | A1 | 1/2004 | Ringermacher et al. |
| 2005/0211916 | A1* | 9/2005 | Matsumoto ............. G21K 4/00 250/484.4 |
| 2006/0214109 | A1 | 9/2006 | Bueno et al. |

FOREIGN PATENT DOCUMENTS

| CN | 1957846 A | * 5/2007 | ............. A61B 6/032 |
| JP | 2000-65933 A | 3/2000 | |
| JP | 2004-64087 A | 2/2004 | |

(Continued)

OTHER PUBLICATIONS

English language translation of the following: Office action dated Jul. 26, 2022 from the JPO in a Japanese patent application No. 2021-515985 corresponding to the instant patent application.

(Continued)

*Primary Examiner* — Kiho Kim
(74) *Attorney, Agent, or Firm* — Solaris Intellectual Property Group, PLLC

(57) ABSTRACT

A radiography apparatus comprising: a first metal-containing layer containing a metal; a scintillator provided in contact with the first metal-containing layer; and a sensor substrate provided with a plurality of pixels that accumulate a charge generated according to light emitted from the scintillator, wherein a stacked body in which the first metal-containing layer, the scintillator, and the sensor substrate are stacked has flexibility.

6 Claims, 8 Drawing Sheets

(56) References Cited

FOREIGN PATENT DOCUMENTS

JP        2006-276014 A    10/2006
KR     20-0419992 Y1    6/2006

OTHER PUBLICATIONS

International Search Report issued in International Application No. PCT/JP2020/016154 dated Jun. 30, 2020.
Written Opinion of the ISA issued in International Application No. PCT/JP2020/016154 dated Jun. 30, 2020.
English language translation of the following: Office action dated Oct. 25, 2022 from the JPO in a Japanese patent application No. 2021-515985 corresponding to the instant patent application. This office action translation is submitted now in order to supplement the understanding of the cited reference which is being disclosed in the instant Information Disclosure Statement.

* cited by examiner

RADIOGRAPHY APPARATUS

CROSS REFERENCE TO RELATED APPLICATIONS

The present application is a Continuation of PCT International Application No. PCT/JP2020/016154, filed on Apr. 10, 2020, which claims priority under 35 U.S.C. § 119(a) to Japanese Patent Application No. 2019-083257, filed on Apr. 24, 2019. Each application above is hereby expressly incorporated by reference, in its entirety, into the present application.

BACKGROUND

Technical Field

The present disclosure relates to a radiography apparatus.

Related Art

The following technique is known as a technique related to radiography. For example, U.S. Pat. No. 9,110,175B describes an imaging plate that includes a phosphor layer and a metal substrate stacked on the phosphor layer. U.S. Pat. No. 9,110,175B describes that secondary energy emitted from the metal substrate exerts a coherent interaction on the phosphor layer.

By the way, there is an apparatus comprising a scintillator that converts radiation into light and a substrate provided with a plurality of pixels that accumulate charges generated according to the light converted by the scintillator, as a radiography apparatus. For example, in a case where such a radiography apparatus is used for non-destructive inspection of a cylindrical structure as an inspection target, it is preferable that the radiography apparatus can be flexibly deformed along a surface shape of an inspection object.

It is necessary to thin the scintillator in order for the radiography apparatus to be flexible. However, the radiation in a high energy region (about 100 to 1,000 keV), which is used especially in the non-destructive inspection, passes through the scintillator in a case where the scintillator is thin. That is, with insufficient sensitivity of the scintillator, an image obtained by the radiography apparatus becomes grainy and unclear.

SUMMARY

The present disclosure has been made in view of the above circumstances, and an object of the present disclosure is to provide a radiography apparatus capable of obtaining a clear image.

In order to achieve the above object, according to an aspect of the present disclosure, there is provided a radiography apparatus comprising a first metal-containing layer containing a metal, a scintillator provided in contact with the first metal-containing layer, and a sensor substrate provided with a plurality of pixels that accumulate a charge generated according to light emitted from the scintillator. A stacked body in which the first metal-containing layer, the scintillator, and the sensor substrate are stacked has flexibility.

In the radiography apparatus of the present disclosure, the first metal-containing layer may be a metal plate.

In the radiography apparatus of the present disclosure, the first metal-containing layer may be a resin containing a metal particle.

In the radiography apparatus of the present disclosure, a surface of the first metal-containing layer in contact with the scintillator may be roughened with a roughness finer than a size of each of the plurality of pixels.

The radiography apparatus of the present disclosure may further comprise a sealing portion that integrally seals the first metal-containing layer and the scintillator.

The radiography apparatus of the present disclosure may further comprise a second metal-containing layer that is provided in contact with a surface of the stacked body on a side of the sensor substrate and contains a metal.

In the radiography apparatus of the present disclosure, the second metal-containing layer may be provided with a first filter that is provided in contact with the surface of the stacked body on the side of the sensor substrate and made of a first metal, a second filter that is provided in contact with the first filter and made of a second metal having specific gravity higher than that of the first metal, and a third filter that is provided in contact with the second filter and made of a third metal having specific gravity higher than that of the second metal.

In the radiography apparatus of the present disclosure, the second metal-containing layer may be provided with a resin film provided in contact with the surface of the stacked body on the side of the sensor substrate, a second filter that is provided in contact with the resin film and made of a second metal, and a third filter that is provided in contact with the second filter and made of a third metal having specific gravity higher than that of the second metal.

According to the present disclosure, it is possible to provide the radiography apparatus capable of obtaining a clear image.

DETAILED DESCRIPTION

Hereinafter, embodiments for implementing a technique of the present disclosure will be described in detail with reference to drawings.

Figure 1:
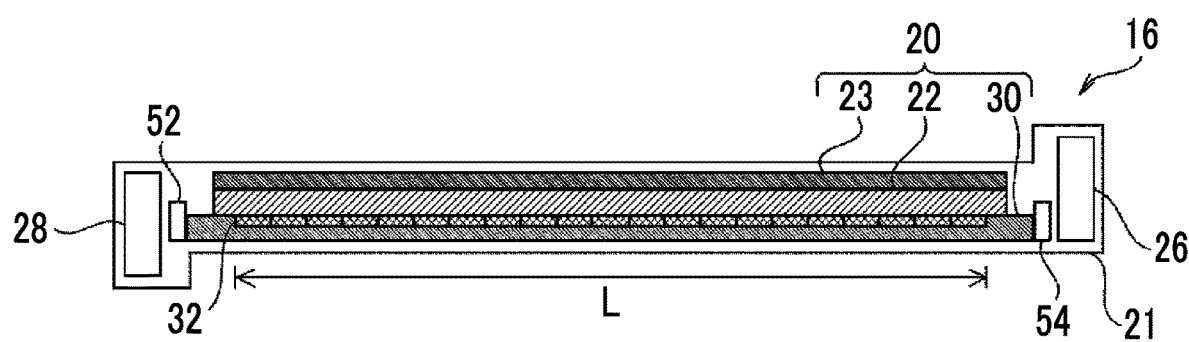
FIG. 1 is a side cross-sectional view of an example of a configuration of a radiography apparatus according to an embodiment.

Next, a configuration of a radiography apparatus 16 according to the present embodiment will be described with reference to FIG. 1. As shown in FIG. 1, the radiography apparatus 16 comprises a housing 21 that transmits radiation, and the housing 21 is provided with a radiation detector 20 that detects the radiation passing through an inspection object. Further, the housing 21 is provided with a control substrate 26, a case 28, a gate line driver 52, and a signal processing unit 54.

The radiation detector 20 comprises a metal plate 23 as an example of a first metal-containing layer that emits a secondary electron with irradiation of the radiation, a scintillator 22 that emits light with the irradiation of the radiation, and a thin film transistor (TFT) substrate 30 as an example of a sensor substrate. The metal plate 23, the scintillator 22, and the TFT substrate 30 are stacked in the order of the metal plate 23, the scintillator 22, and the TFT substrate 30 from an incident side of the radiation. That is, the radiation detector 20 is a penetration side sampling (PSS) radiation detector in which the radiation is irradiated from a scintillator 22 side to which the metal plate 23 directly adheres. The metal plate 23 and the scintillator 22 are stacked so as to cover all pixel regions L provided with pixels 32 described below provided in the TFT substrate 30.

A base material of the TFT substrate 30 according to the present embodiment is a resin sheet having flexibility and containing, for example, a plastic such as polyimide (PI). A thickness of the base material of the TFT substrate 30 may be any thickness as long as desired flexibility can be obtained according to hardness of the material, a size of the TFT substrate 30, and the like. The thickness of the resin sheet may be, for example, 5 μm to 125 μm and more preferably 20 μm to 50 μm. A specific example of the resin sheet includes XENOMAX (registered trademark).

The scintillator 22 according to the present embodiment has flexibility and contains, for example, a gadolinium sulfate (GOS). A thickness of the scintillator 22 may be any thickness as long as desired flexibility can be obtained according to hardness of a material, a size of the scintillator 22, and the like.

The metal plate 23 according to the present embodiment has flexibility and contains, for example, a metal, such as lead, copper, tungsten, tantalum, steel, stainless steel, brass, aluminum, nickel, cobalt, silver, gold, or platinum, and a metal compound. It is desirable that a material of the metal plate 23 is selected in consideration of efficiency of a sensitizing action of the metal plate 23 described in detail below. A thickness of the metal plate 23 may be any thickness as long as desired flexibility can be obtained according to hardness of the material, a size of the metal plate 23, and the like. The thickness thereof may be set based on a first half-value layer and a second half-value layer of the material of the metal plate 23, an escape distance of the secondary electron described in detail below, or the like.

The case 28 and the gate line driver 52 are provided with the control substrate 26 and the signal processing unit 54 on opposite sides of the radiation detector 20 with the radiation detector 20 interposed therebetween. The case 28 and the gate line driver 52 may be provided with the control substrate 26 and the signal processing unit 54 on the same side of the radiation detector 20.

In the control substrate 26, electronic circuits such as an image memory 56, a control unit 58, and a communication unit 66, which will be described below, are formed on the substrate. The case 28 accommodates a power supply unit 70 described below and the like.

Figure 2:
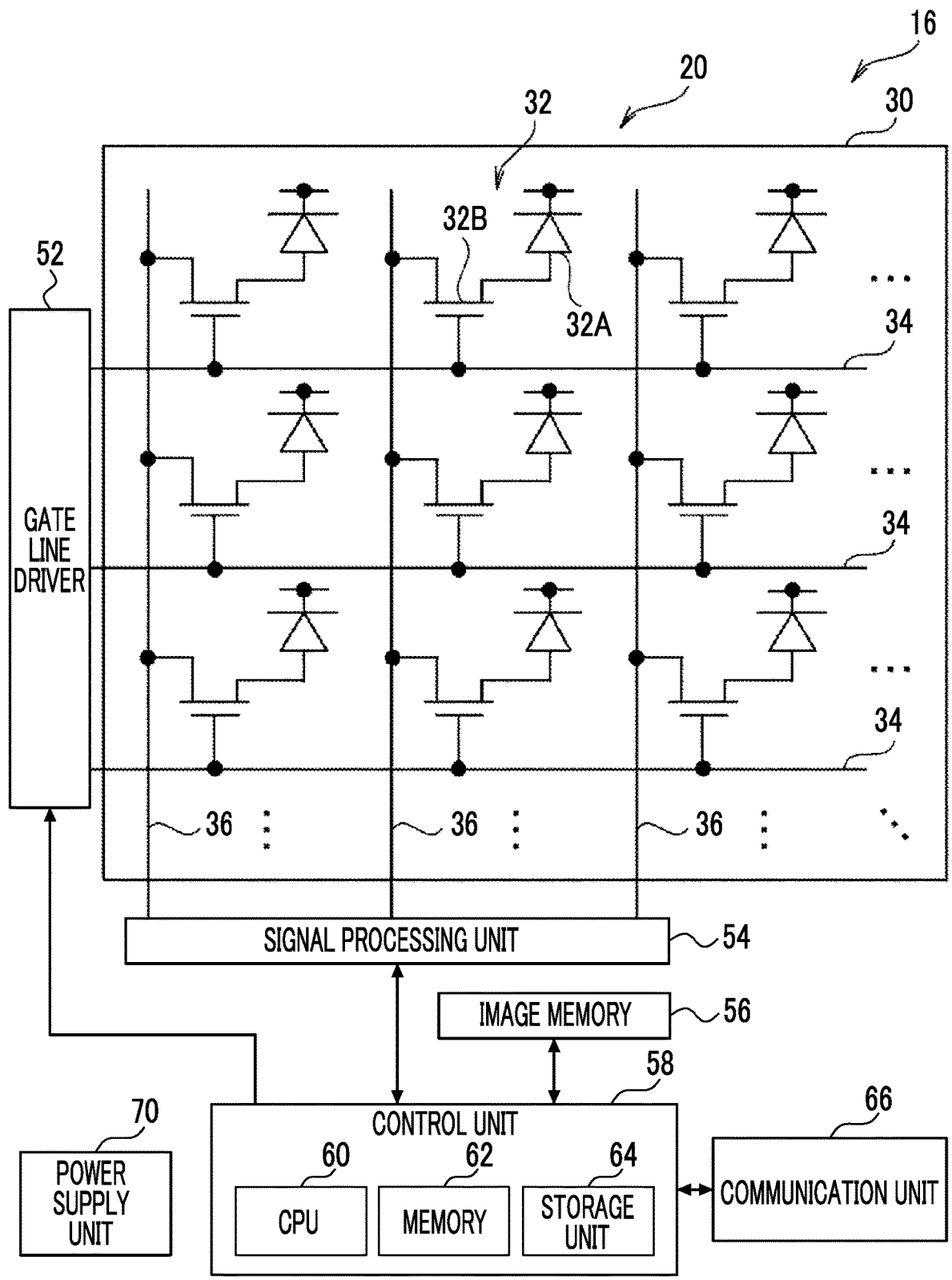
FIG. 2 is a block diagram showing an example of a configuration of a main part of an electrical system of the radiography apparatus according to the embodiment.

Next, a configuration of a main part of an electrical system of the radiography apparatus 16 according to the present embodiment will be described with reference to FIG. 2. As shown in FIG. 2, a plurality of pixels 32 are two-dimensionally provided in one direction (a row direction in FIG. 2) and an intersection direction (a column direction in FIG. 2) that intersects the one direction in the TFT substrate 30. The pixel 32 includes a sensor unit 32A and an electric field effect thin film transistor (TFT; hereinafter, simply referred to as a "thin film transistor") 32B.

The sensor unit 32A includes an upper electrode, a lower electrode, and a photoelectric conversion film which are not shown, absorbs light emitted from the scintillator 22, generates a charge, and accumulates the generated charge. The thin film transistor 32B converts the charge accumulated in the sensor unit 32A into an electric signal and outputs the electric signal. The sensor unit 32A is an example of a conversion element that generates a larger amount of charge as an amount of irradiated radiation becomes larger. The thin film transistor 32B is an example of a switching element that outputs the charge generated in the sensor unit 32A as the electric signal.

A plurality of gate lines 34 which extend in the one direction and are used to turn on and off each thin film transistor 32B are provided in the TFT substrate 30. Further, a plurality of data lines 36 which extend in the intersection direction and are used to read out the charge through the thin film transistors 32B in an on state are provided in the TFT substrate 30. Each gate line 34 of the TFT substrate 30 is connected to the gate line driver 52, and each data line 36 of the TFT substrate 30 is connected to the signal processing unit 54.

Each thin film transistor 32B of the TFT substrate 30 is sequentially turned on in row unit by the electric signal which is supplied from the gate line driver 52 through the gate lines 34. The charge read out by the thin film transistor 32B in the on state is transmitted as the electric signal through the data line 36 and is input to the signal processing unit 54. Accordingly, the charges are sequentially read out in row unit and image data indicating a two-dimensional radiographic image is acquired.

The signal processing unit 54 comprises an amplifier circuit for amplifying the electric signal to be input and a sample and hold circuit (both not shown) for each individual data line 36, and the electric signal transmitted through the individual data line 36 is amplified by the amplifier circuit and then held in the sample and hold circuit. A multiplexer and an analog-to-digital (A/D) converter are sequentially connected to an output side of the sample and hold circuit. The electric signals held in the individual sample and hold circuits are sequentially (serially) input to the multiplexer, and the electric signals sequentially selected by the multiplexer are converted into digital image data by the A/D converter.

The control unit 58 described below is connected to the signal processing unit 54, and pieces of image data output from the A/D converter of the signal processing unit 54 are sequentially output to the control unit 58. The image memory 56 is connected to the control unit 58, and the pieces of image data sequentially output from the signal processing unit 54 are sequentially stored in the image memory 56 under the control of the control unit 58. The image memory 56 has a storage capacity capable of storing a predetermined number of pieces of image data, and the pieces of image data obtained by imaging are sequentially stored in the image memory 56 every time the imaging of the radiographic image is performed.

The control unit 58 comprises a central processing unit (CPU) 60, a memory 62 including, for example, a read only memory (ROM) and a random access memory (RAM), and a non-volatile storage unit 64 such as a flash memory. An example of the control unit 58 includes a microcomputer.

The communication unit 66 is connected to the control unit 58, and transmits and receives various pieces of information to and from an external device such as the radiation irradiation device 12 and the correction device 14, which will be described below, by wireless communication. The power supply unit 70 supplies power to the various circuits and each element such as the gate line driver 52, the signal processing unit 54, the image memory 56, the control unit 58, and the communication unit 66. In FIG. 2, lines for connecting the power supply unit 70 to various circuits and each element are not shown in order to avoid complications.

Figure 3:
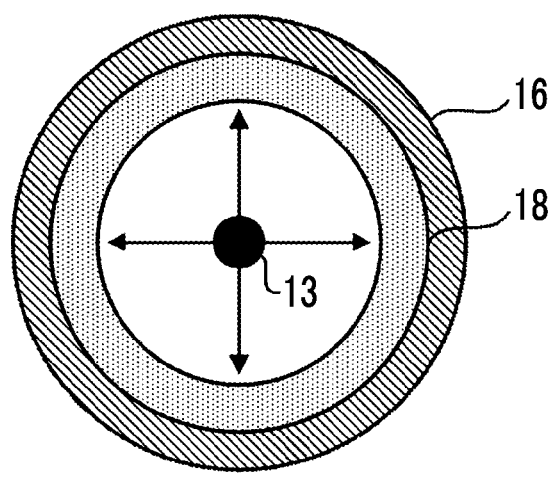
FIG. 3 is a diagram showing an example of a state in which the radiography apparatus according to the embodiment is provided on an inspection object.

A portion of the housing 21 facing a detection surface of the radiation detector 20 according to the present embodiment also has the flexibility similar to the metal plate 23, the scintillator 22, and the TFT substrate 30. Therefore, as shown in FIG. 3 as an example, the radiography apparatus 16 can be provided on an inspection object 18 in a state of being bent along an outer shape of the inspection object 18. For example, a cylindrical object such as a pipe of a natural gas pipeline can be employed as the inspection object 18, and a radiation source 13 can be disposed inside the inspection object 18.

Figure 4:
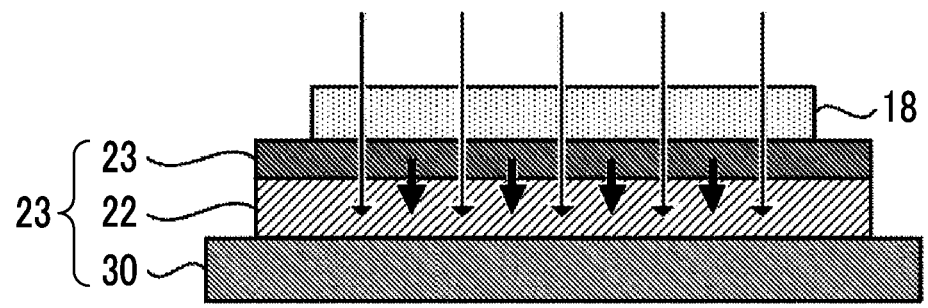
FIG. 4 is a view for describing a sensitizing action of a metal plate according to the embodiment.

Next, the sensitizing action of the scintillator 22 by the metal plate 23 according to the present embodiment will be described with reference to FIGS. 4, 5, and 6. As shown in FIG. 4, the radiation irradiated to the inspection object 18 passes through the metal plate 23 and then reaches the scintillator 22. In a case where the metal plate 23 is irradiated with radiation, the secondary electron (backscattered electron) is emitted from a surface of the metal plate 23 due to Compton scattering. Therefore, the secondary electron generated in the metal plate 23 reaches the scintillator 22.

Figure 5:
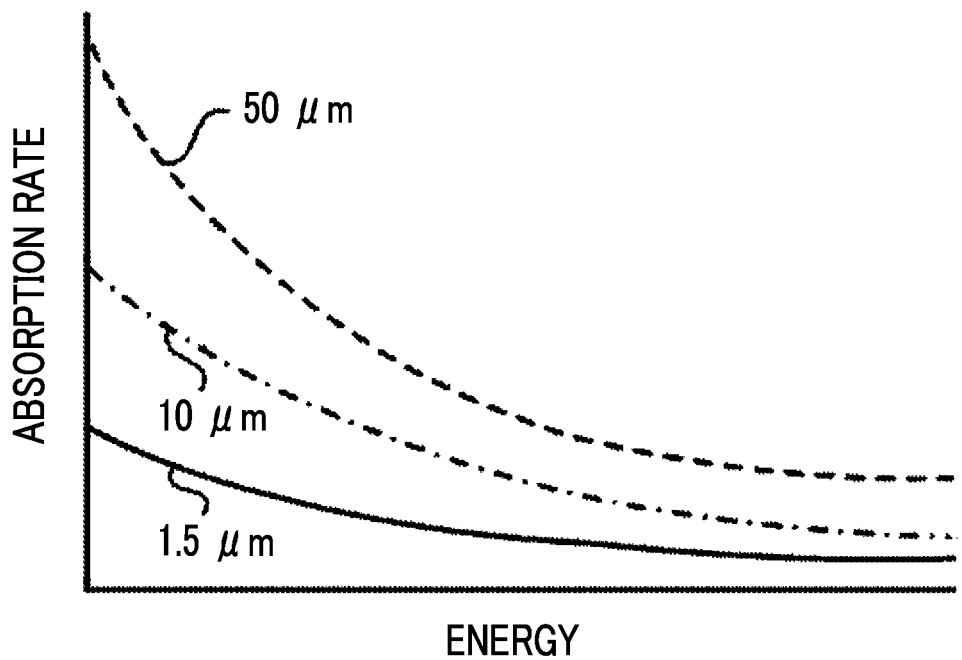
FIG. 5 is a graph showing an absorption rate of a scintillator according to the embodiment.

FIG. 5 shows a schematic view of an absorption rate of the GOS, which is an example of the material of the scintillator 22 according to the present embodiment, with different thicknesses of the GOS. The vertical axis is the absorption rate of the radiation in the scintillator 22, and the horizontal axis is energy of the radiation irradiated to the scintillator 22. It can be seen from FIG. 5 that the absorption rate of the scintillator 22 is lower as the energy of the radiation is higher and the thickness of the scintillator 22 is thinner. Therefore, since the absorption rate of the scintillator 22 is lowered (light transmittance increases) in a case where the thickness of the scintillator 22 is thinned to such an extent that the flexibility can be obtained in non-destructive inspection using high-energy radiation, the obtained image is an unclear image with reduced contrast. With the radiography apparatus 16 according to the present embodiment, the sensitivity of the scintillator 22 is improved due to the sensitizing action by the secondary electron emitted from the metal plate 23, which adheres to the scintillator 22, and thus a clear image is obtained.

Figure 6:
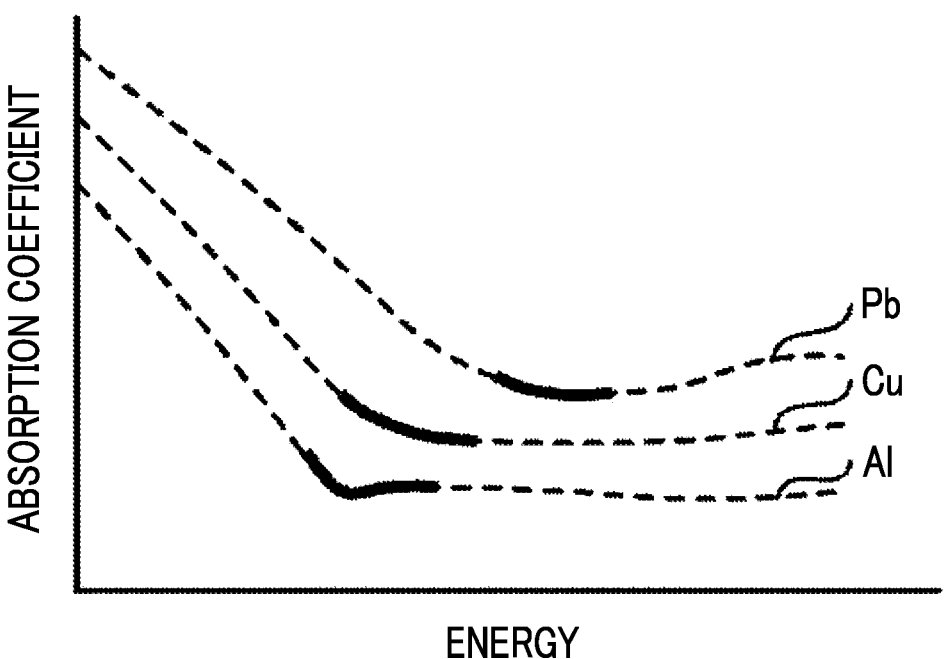
FIG. 6 is a graph showing a mass energy absorption coefficient of the metal plate according to the embodiment.

FIG. 6 shows a schematic view of a mass energy absorption coefficient of each of aluminum, copper, and lead by a broken line, as an example of the material of the metal plate 23 according to the present embodiment. The vertical axis is the mass energy absorption coefficient of each metal, and the horizontal axis is the energy of the radiation irradiated to each metal. The mass energy absorption coefficient is determined by the interaction between the radiation and each substance, and it is known that a photoelectric effect mainly contributes in a low energy region, a Compton effect in a medium energy region, and electron pair generation in the high energy region. In FIG. 6, a range shown by a solid line is a region in which Compton scattering mainly contributes to the mass energy absorption coefficient. Since the secondary electron is considered to be generated by the Compton scattering, in a case where the metal plate 23 is irradiated with the radiation having energy in the region shown by the solid line in FIG. 6, the secondary electron is efficiently emitted.

As shown in FIG. 6, the energy region in which the secondary electron is efficiently emitted is different for each material of the metal plate 23. Therefore, it is desirable to select the material of the metal plate 23 according to a tube voltage of the radiation source 13 used. The tube voltage of the radiation source 13 is desirable to set according to a material and thickness of the inspection object 18. A filter for extracting the energy region in which the secondary electron is efficiently emitted from the metal plate 23 may be provided between the radiation source 13 and the radiography apparatus 16.

The secondary electron generated inside the metal plate 23 has low energy and the escape distance is as short as several to several tens of nm. Therefore, the secondary electron generated at a location deeper than the escape distance is absorbed by the metal plate 23 itself without being emitted from the metal plate 23, and thus cannot reach the scintillator 22. Therefore, it is desirable that the thickness of the metal plate 23 is about the escape distance of the secondary electron. The escape distance is an average distance at which the secondary electron escapes from a solid surface without losing energy.

As described above, with the radiography apparatus 16 according to the present embodiment, the sensitivity of the scintillator 22 can be improved by the secondary electron emitted from the metal plate 23, and thus it is possible to obtain a clear image.

Next, a filter action of the metal plate 23 according to the present embodiment will be described with reference to FIGS. 7A to 7D. For FIGS. 7A to 7D, the vertical axis is relative intensity of the radiation and the horizontal axis is the energy of the radiation. As shown in FIG. 6, the metal plate 23 has a high absorption rate mainly in the low energy region. Therefore, the metal plate 23 acts as a filter for suppressing the reaching of the radiation in the low energy region to the scintillator 22, in addition to the sensitizing action. In the non-destructive inspection, the radiation in the low energy region affects the image as noise. With the radiography apparatus 16 according to the present embodiment, the metal plate 23 absorbs the radiation in the low energy region, and thus a clear image is obtained.

Figure 7A:
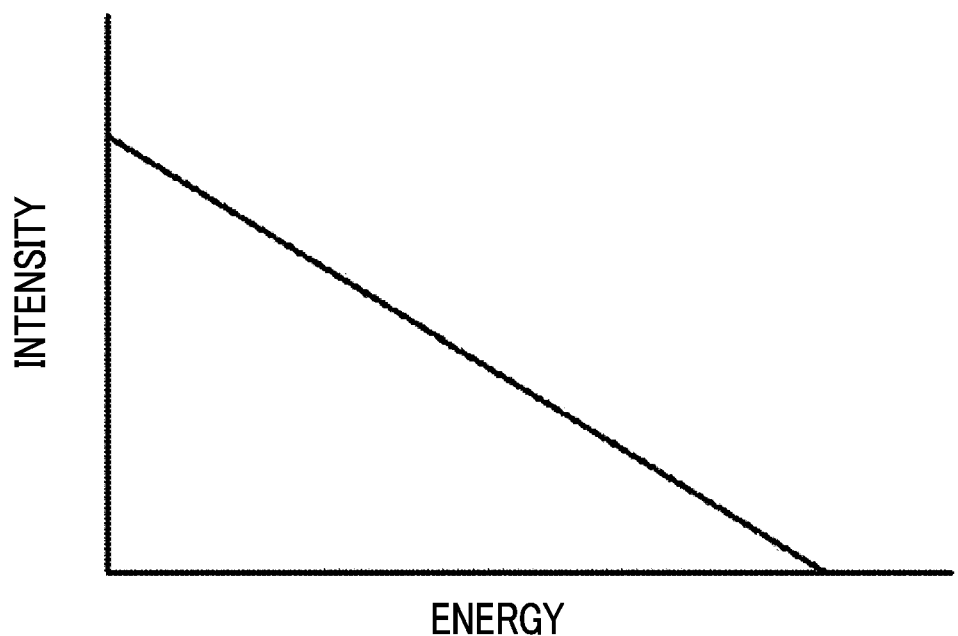
FIG. 7A is a graph showing an energy distribution of radiation emitted from a radiation source.
Figure 7B:
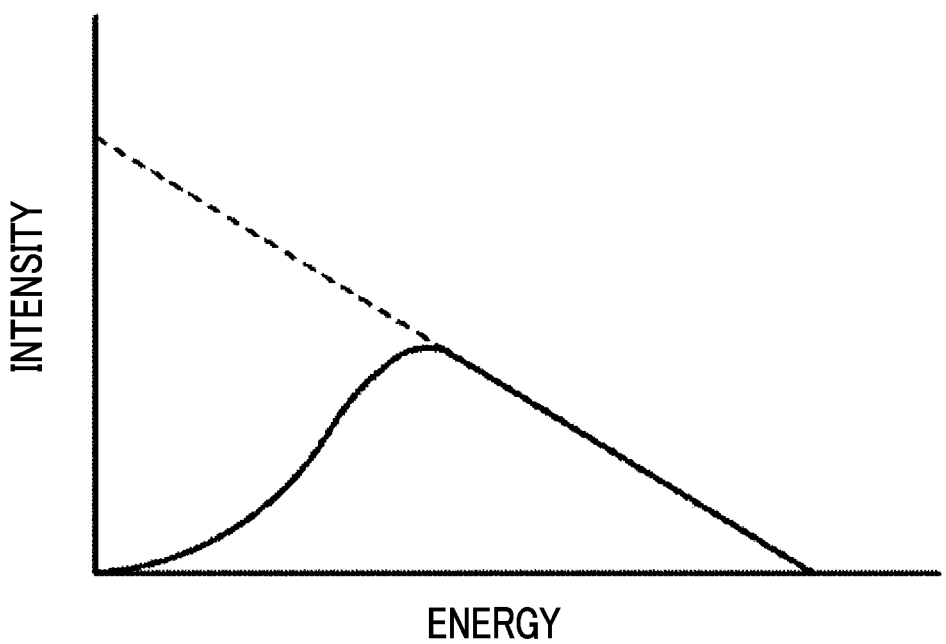
FIG. 7B is a graph showing an energy distribution of the radiation after passing through a filter.

As shown in FIG. 7A, an energy distribution of the radiation emitted from the radiation source 13 is larger in the lower energy region. Therefore, a filter that blocks the low energy region is used in order to obtain a clear image. The filter is, for example, a filter usually used in a radiography apparatus composed of aluminum, copper, molybdenum, rhodium, or the like. As shown in FIG. 7B, an energy distribution of the radiation that passes through the filter is blocked in the low energy region.

Figure 7C:
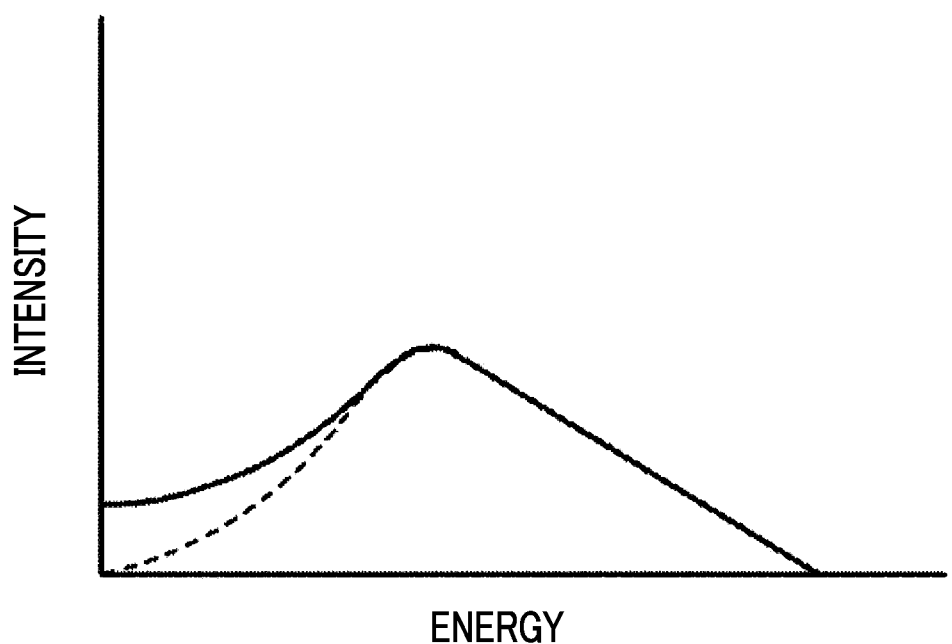
FIG. 7C is a graph showing an energy distribution of the radiation after passing through the inspection object.
Figure 7D:
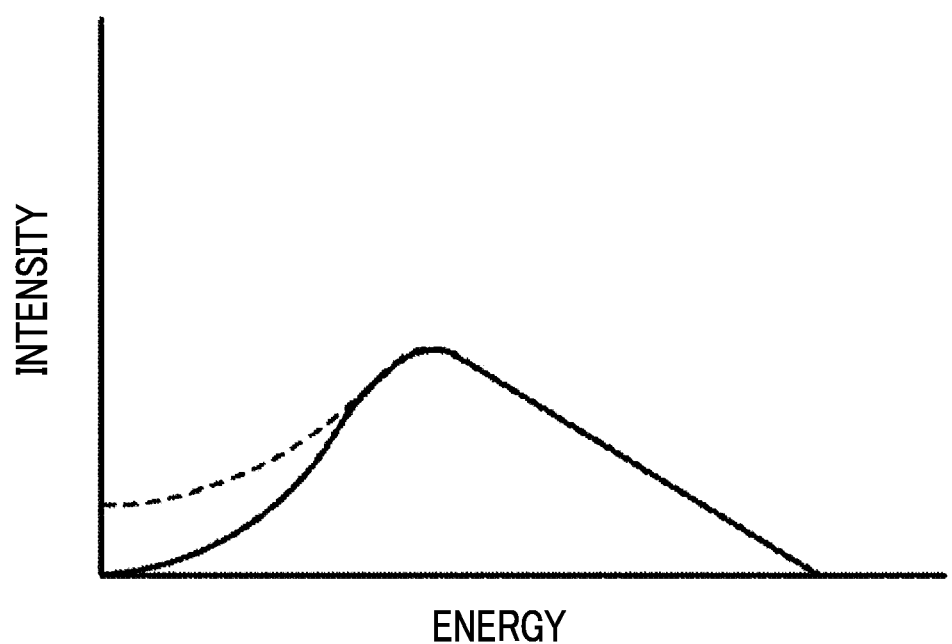
FIG. 7D is a graph showing an energy distribution of the radiation after passing through the metal plate.

As shown in FIG. 7C, an energy distribution of the radiation that passes through the inspection object 18 increases in the intensity in the low energy region due to influence of a scattered ray generated from the inspection object 18. As shown in FIG. 7D, since the metal plate 23 absorbs the radiation in the low energy region, an energy distribution of the radiation that passes through the metal plate 23 becomes a distribution in which the low energy region is blocked.

As described above, with the radiography apparatus 16 according to the present embodiment, the metal plate 23 blocks the scattered rays generated from the inspection object 18, and thus the reaching of the radiation in the low energy region to the scintillator 22 is suppressed. Therefore, it is possible to obtain a clear image.

Figure 8:
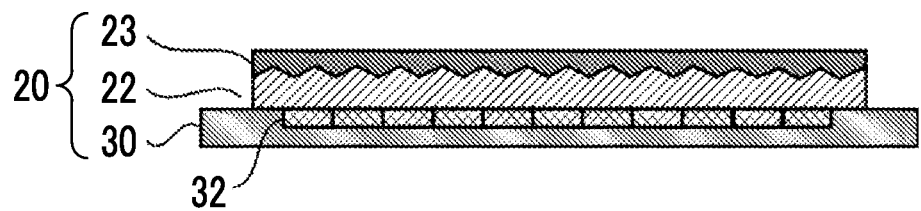
FIG. 8 is a side cross-sectional view of an example of roughening of the metal plate according to the embodiment.

Next, roughening treatment of the metal plate 23 according to the present embodiment will be described with reference to FIG. 8. As shown in FIG. 8, a surface of the metal plate 23 in contact with the scintillator 22 may be roughened with a roughness finer than a size of each of the pixels 32. The roughening is realized by, for example, mechanical roughening treatment using a roller-shaped brush, electrochemical roughening treatment that performs electrolysis in an electrolytic solution, chemical roughening treatment that performs immersion in a chemical solution, and the like.

With the roughening of the surface of the metal plate 23 in contact with the scintillator 22 with the roughness finer than the size of each of the pixels 32, it is possible to increase a bonding force between the metal plate 23 and the scintillator 22 without affecting the image. That is, since an area where the metal plate 23 and the scintillator 22 are in contact with each other becomes large, more secondary electrons emitted from the metal plate 23 can reach the scintillator 22.

As described above, with the radiography apparatus 16 according to the present embodiment, the sensitivity of the scintillator 22 can be improved by the secondary electron emitted from the metal plate 23, which is subjected to the roughening treatment. Therefore, it is possible to obtain a clear image.

Next, a sealing portion 24 according to the present embodiment will be described with reference to FIG. 9. In a case where the scintillator 22 has deliquescency, it is preferable to suppress invasion of moisture into the scintillator 22. In the present embodiment, since the metal plate 23 directly adheres to the scintillator 22, it is possible to protect the scintillator 22 from the moisture with the metal plate 23.

Figure 9:
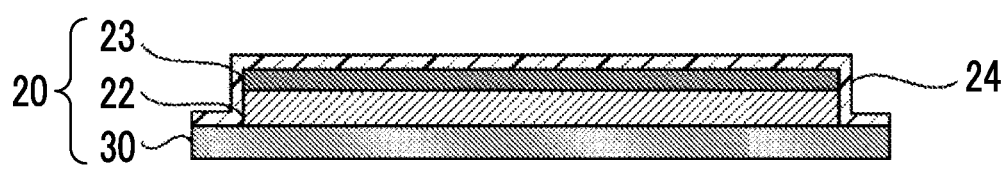
FIG. 9 is a side cross-sectional view of an example of a sealing portion according to the embodiment.

On the other hand, in order to further protect the scintillator 22 from the moisture, the radiography apparatus 16 according to the present embodiment may comprise the sealing portion 24 that integrally seals the metal plate 23 and the scintillator 22, as shown in FIG. 9. That is, the sealing portion 24 covers an upper surface and a side surface of the metal plate 23 and a side surface of the scintillator 22. For the sealing portion 24, a material having a barrier property against moisture in the atmosphere is used, and an acrylic resin or a silicone resin can be used, for example.

Usually, the scintillator 22 is sealed with a resin in order to protect the scintillator 22 from the moisture. However, for example, in FIG. 9, in a case where the resin is stacked between the metal plate 23 and the scintillator 22, it becomes difficult for the secondary electron generated in the metal plate 23 to reach the scintillator. With the radiography apparatus 16 according to the present embodiment, the sealing portion 24 integrally seals the metal plate 23 and the scintillator 22, and thus it is possible to protect the scintillator 22 from the moisture without hindering the adhesion between the metal plate 23 and the scintillator 22. Therefore, it is possible to cause the secondary electron generated in the metal plate 23 to easily reach the scintillator 22, and it is possible to improve the sensitivity of the scintillator 22 with the secondary electron emitted from the metal plate 23.

As described above, with the radiography apparatus 16 according to the present embodiment, the metal plate 23 and the scintillator 22 are integrally sealed. Therefore, it is possible to improve the sensitivity of the scintillator 22 with the secondary electron emitted from the metal plate 23, and thus it is possible to obtain a clear image.

Figure 10:
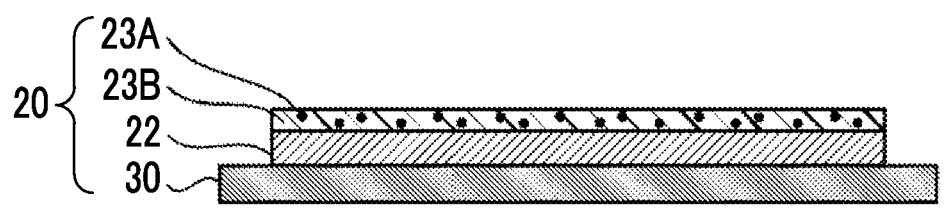
FIG. 10 is a side cross-sectional view of an example of a resin containing metal particles according to the embodiment.

Next, another aspect of the first metal-containing layer according to the present embodiment will be described with reference to FIG. 10. As shown in FIG. 10, the metal plate 23 described above may be a resin 23B containing a metal particle 23A. The metal particle 23A is composed of a metal, such as lead, copper, tungsten, tantalum, steel, stainless steel, brass, aluminum, nickel, cobalt, silver, gold, or platinum, and a metal compound. The resin 23B is made of, for example, an acrylic resin or a silicone resin. A thickness of the resin 23B may be any thickness as long as desired flexibility can be obtained according to hardness of a material, the size of the metal plate 23, and the like.

An absorption rate of the resin 23B is lower than an absorption rate of metal. Therefore, most secondary electrons emitted from the metal particle 23A in a case where the metal particle 23A is irradiated with the radiation are not absorbed by the resin 23B and can reach the scintillator 22. Therefore, it is possible to enhance the sensitizing action by the secondary electron as compared with the case where the metal plate 23 is used.

As described above, with the radiography apparatus 16 according to the present embodiment, the sensitivity of the scintillator 22 can be improved by the secondary electron emitted from the metal particle 23A contained in the resin 23B, and thus it is possible to obtain a clear image.

Figure 11:
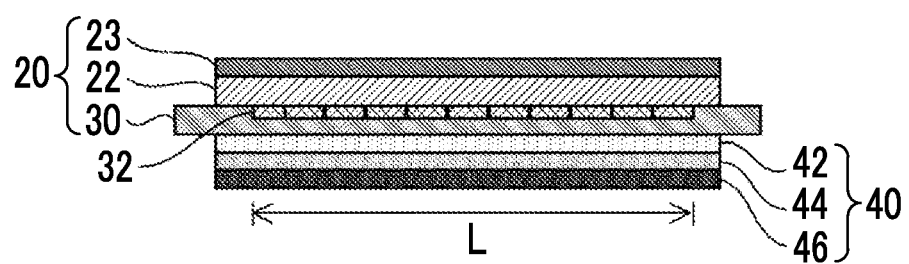
FIG. 11 is a side cross-sectional view of an example of a configuration of a second metal-containing layer according to the embodiment.

Next, a configuration of a second metal-containing layer 40 according to the present embodiment will be described with reference to FIG. 11. As shown in FIG. 11, the radiography apparatus 16 according to the present embodiment may be provided in contact with a surface of the radiation detector 20 on a TFT substrate 30 side and further comprise the second metal-containing layer 40 containing metal. The second metal-containing layer 40 may be provided inside the housing 21 of the radiography apparatus 16 or may be provided outside the housing 21. The second metal-containing layer 40 may or may not have the flexibility similar to the radiation detector 20.

The second metal-containing layer 40 comprises a first filter 42, a second filter 44, and a third filter 46. The first filter 42, the second filter 44, and the third filter 46 are disposed in the order of the first filter 42, the second filter 44, and the third filter 46 from an incident side of the radiation. The first filter 42, the second filter 44, and the third filter 46 are disposed so as to cover all the pixel regions L in which the pixels 32 provided in the TFT substrate 30 are provided.

A first metal constituting the first filter 42 according to the present embodiment includes, for example, a light metal, such as magnesium and lithium, and a metal compound. A second metal constituting the second filter 44 according to the present embodiment includes, for example, a metal having specific gravity higher than that of the first metal, such as iron and copper, and a metal compound. A third metal constituting the third filter 46 according to the present embodiment includes, for example, a metal having specific gravity higher than that of the second metal, such as lead, and a metal compound. Each thickness of the first filter 42, the second filter 44, and the third filter 46 may be any thickness as long as a desired absorption rate can be obtained according to a radiation absorption rate described in detail below.

Figure 12A:
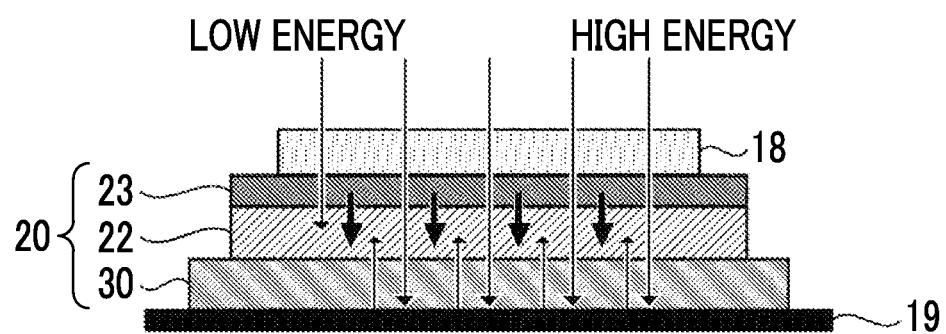
FIG. 12A is a view for describing an action of the second metal-containing layer according to the embodiment.
Figure 12B:
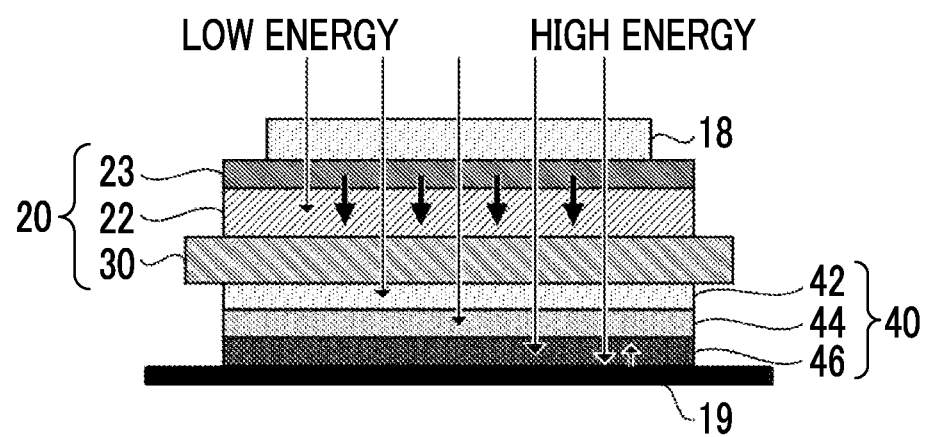
FIG. 12B is a view for describing the action of the second metal-containing layer according to the embodiment.

Next, an action of the second metal-containing layer 40 according to the present embodiment will be described with reference to FIGS. 12A and 12B. As shown in FIG. 12A, the radiation in a particularly high energy region among the radiation irradiated to the inspection object 18 passes through the scintillator 22 and the TFT substrate 30. The radiation that passes through the TFT substrate 30 reaches an obstacle 19 outside the radiography apparatus 16. The obstacle 19 is, for example, a structure around the inspection object 18 or the radiography apparatus 16 behind a portion where end portions of the radiography apparatus 16 overlap each other in a case where the radiography apparatus 16 is wound around the inspection object 18 as shown in FIG. 3. In a case where the obstacle 19 is irradiated with the radiation, a backscattered ray is generated from the obstacle 19 and the scintillator 22 may emit light due to the backscattered ray. In that case, the image becomes unclear due to the influence of the backscattered ray. With the radiography apparatus 16 according to the present embodiment, the backscattered ray is suppressed by the second metal-containing layer 40, and thus a clear image is obtained.

As shown in FIG. 6, the mass energy absorption coefficient increases as the specific gravity of the metal increases. Therefore, as shown in FIG. 12B, with provision of a plurality of filters in ascending order of the specific gravity of the metal from the incident side of the radiation, it is possible to efficiently absorb the radiation before the radiation reaches the obstacle 19. With the provision of the plurality of filters in ascending order of the specific gravity of the metal from the incident side of the radiation, a characteristic X-ray generated by the photoelectric effect and the Compton effect in the filter in a preceding stage can be absorbed by the filter in a succeeding stage. Even in a case where the radiation passes through the plurality of filters and reaches the obstacle 19 in the particularly high energy region, the backscattered ray generated in the obstacle 19 can be absorbed by the plurality of filters.

The first filter 42 may be made of, for example, a resin film such as an acrylic resin or a silicone resin. The resin film can also exhibit the same function as that of the first metal.

The number and types of filters provided in the second metal-containing layer 40 are not limited to the three types of the first filter 42, the second filter 44, and the third filter 46. One or a plurality of filters may be provided according to the energy of the radiation irradiated to the radiography apparatus 16.

As described above, with the radiography apparatus 16 according to the present embodiment, the backscattered ray can be suppressed by the second metal-containing layer 40, and thus it is possible to obtain a clear image.

The case where the PSS radiation detector in which the radiation is irradiated from the scintillator 22 side is employed as the radiation detector 20 is described in the above embodiment, but the present disclosure is not limited thereto. For example, a so-called irradiation side sampling (ISS) radiation detector in which the radiation is irradiated from the TFT substrate 30 side may be employed as the radiation detector 20.

The disclosure of JP2019-083257 filed on Apr. 24, 2019 is incorporated herein by reference in its entirety. All documents, patent applications, and technical standards described in this specification are incorporated by reference in this specification to the same extent as in a case where the incorporation of each individual document, patent application, and technical standard by reference is specifically and individually described.

What is claimed is:
1. A radiography apparatus comprising:
a first metal-containing layer containing a metal;
a scintillator provided in contact with the first metal-containing layer; and
a sensor substrate provided with a plurality of pixels that accumulate a charge generated according to light emitted from the scintillator,
wherein a stacked body in which the first metal-containing layer, the scintillator, and the sensor substrate are stacked has flexibility;
wherein the radiography apparatus further comprises a second metal-containing layer that is provided in contact with a surface of the stacked body on a side of the sensor substrate and contains a metal, and
wherein the second metal-containing layer is provided with:
a first filter that is provided in contact with the surface of the stacked body on the side of the sensor substrate and made of a first metal,
a second filter that is provided in contact with the first filter and made of a second metal having specific gravity higher than that of the first metal, and
a third filter that is provided in contact with the second filter and made of a third metal having specific gravity higher than that of the second metal.
2. The radiography apparatus according to claim 1, wherein the first metal-containing layer is a metal plate.
3. The radiography apparatus according to claim 1, wherein the first metal-containing layer is a resin containing a metal particle.
4. The radiography apparatus according to claim 1, wherein a surface of the first metal-containing layer in contact with the scintillator is roughened with a roughness finer than a size of each of the plurality of pixels.
5. The radiography apparatus according to claim 1, further comprising:
a sealing portion that integrally seals the first metal-containing layer and the scintillator.
6. A radiography apparatus comprising:
a first metal-containing layer containing a metal;
a scintillator provided in contact with the first metal-containing layer; and
a sensor substrate provided with a plurality of pixels that accumulate a charge generated according to light emitted from the scintillator,
wherein a stacked body in which the first metal-containing layer, the scintillator, and the sensor substrate are stacked has flexibility,
the radiography apparatus further comprising:
a second metal-containing layer that is provided in contact with a surface of the stacked body on a side of the sensor substrate and contains a metal,
wherein the second metal-containing layer is provided with:

a resin film provided in contact with the surface of the stacked body on the side of the sensor substrate, a filter that is provided in contact with the resin film and made of a metal, and another filter that is provided in contact with the filter, which contacts with the resin film, and made of another metal having specific gravity higher than that of the metal of the filter, which contacts with the resin film.

\* \* \* \* \*